(12) United States Patent
Erdogan

(10) Patent No.: US 7,306,393 B2
(45) Date of Patent: Dec. 11, 2007

(54) ELASTOMER JOINT

(75) Inventor: Cengiz Erdogan, Geldern (DE)

(73) Assignee: TRW Automotive GmbH (DE)

( * ) Notice: Subject to any disclaimer, the term of this patent is extended or adjusted under 35 U.S.C. 154(b) by 220 days.

(21) Appl. No.: 10/917,851

(22) Filed: Aug. 13, 2004

(65) Prior Publication Data

US 2005/0241860 A1    Nov. 3, 2005

Related U.S. Application Data

(63) Continuation of application No. PCT/EP03/01442, filed on Feb. 13, 2003.

(30) Foreign Application Priority Data

Feb. 14, 2002  (DE) ........................... 202 02 241 U

(51) Int. Cl.
  *F16C 11/00* (2006.01)
  *F16D 1/12* (2006.01)
(52) U.S. Cl. ..................... 403/133; 403/135; 403/140
(58) Field of Classification Search ........ 403/133–135, 403/140; 180/358, 384; 384/215, 220; 267/292–294
  See application file for complete search history.

(56) References Cited

U.S. PATENT DOCUMENTS

| 3,650,004 | A | * | 3/1972 | Bergstrom | 29/898.01 |
| 4,290,181 | A | * | 9/1981 | Jackson | 29/458 |
| 4,318,627 | A | * | 3/1982 | Morin | 403/133 |
| 4,641,861 | A | * | 2/1987 | Scoboria | 285/39 |
| 4,883,263 | A | | 11/1989 | Buhl | |
| 5,564,853 | A | * | 10/1996 | Maughan | 403/137 |
| 5,752,780 | A | * | 5/1998 | Dorr | 403/135 |
| 6,772,196 | B1 | * | 8/2004 | Kirsch et al. | 709/206 |
| 6,773,196 | B2 | * | 8/2004 | Broker et al. | 403/133 |

FOREIGN PATENT DOCUMENTS

| CH | 338 658 | 5/1959 |
| DE | 19 60 546 | 12/1970 |
| DE | 19 36 768 | 2/1971 |
| DE | 37 15 360 | 12/1988 |
| DE | 39 06 079 | 9/1989 |
| DE | 39 36 775 | 11/1990 |
| DE | 100 06 178 | 8/2001 |

* cited by examiner

*Primary Examiner*—Daniel P. Stodola
*Assistant Examiner*—Nahid Amiri
(74) *Attorney, Agent, or Firm*—MacMillan, Sobanski & Todd, LLC

(57) ABSTRACT

An elastomer joint, in particular for chassis parts of motor vehicles, comprising a housing (6), an elastomer body (2) arranged in the housing (6), and a joint body (1) that is arranged in the elastomer body (2), is characterized in that the housing (6) has a cylindrical inner wall, and a spacer (4) is provided that is arranged at an axial end of the elastomer body (2) between the latter and the inner wall.

7 Claims, 2 Drawing Sheets

ELASTOMER JOINT

CROSS REFERENCE TO RELATED APPLICATIONS

This application is a continuation of International Application No. PCT/EP03/01442 filed Feb. 13, 2003, the disclosures of which are incorporated herein by reference, and which claimed priority to German Patent Application No. 202 02 241.2 filed Feb. 14, 2002, the disclosures of which are incorporated herein by reference.

BACKGROUND OF THE INVENTION

The invention relates to an elastomer joint, in particular for chassis parts of motor vehicles, comprising a housing, an elastomer body arranged in the housing, and a joint body that is arranged in the elastomer body.

Elastomer joints are maintenance-free, insensitive to external environmental influences and are used in automotive manufacturing for precise axle guidance as well as for greater riding comfort, for example, in buses. According to the prior art, the elastomer body of the joint is prestressed between two support rings, this generally resulting in a radial spring rate which has the drawback that interfering frequencies in the form of vibrations and noises from the drive train can be transmitted to the passenger compartment.

Published Patent Application DE 3 715 360, and corresponding U.S. Pat. No. 4,883,263 which is incorporated by reference herein, discloses a joint of the type mentioned at the outset, in which the sleeve-shaped elastomer body is prestressed between two support rings and in which material recesses are provided in a middle zone on the inner surface of the housing, whose inner surface is cylindrical, so that a space is created into which the elastomer body can deflect, which reduces the prestress of the elastomer body in this area. As the load increases, this results in a progressive spring rate of the joint, and consequently a better vibration and noise damping is achieved.

However, these material recesses on the inner surface of the housing entail a relatively complex manufacturing process in comparison to the production of a housing with a smooth cylindrical inner wall. Moreover, the service life of such a joint is greatly reduced due to greater abrasion of the elastomer at sizeable angle excursions of the pin.

SUMMARY OF THE INVENTION

The object of the invention consists in providing an elastomer joint of the type mentioned at the outset which, in spite of a progressive spring rate, can be produced cost-effectively and which, in comparison to the configurations known so far, is intended to have a reduced torsional rigidity and a longer service life.

For this purpose, according to the invention, an elastomer joint of the type mentioned at the outset is configured in such a way that the housing has a cylindrical inner wall, and a spacer is provided that is arranged at an axial end of the elastomer body between the latter and the inner wall. In this manner, even without material recesses on the cylindrical inner surface of the housing, a free space is created inside the joint between the elastomer body and the inner wall of the housing, owing to which a reduction of the prestress of the elastomer body can be achieved.

The spacer can be arranged directly at the support ring and can be configured together with it in one piece or can be adjacent to it as an insert part. In the one-piece configuration, the spacer is preferably designed as an encircling collar on the support ring, and the collar can be provided with a chamfer, so that the elastomer body makes a gentle transition to the inner wall of the housing. This reduces the risk of crack formation in the elastomer body on an edge of the spacer at the transition to the housing. The housing itself has a smooth cylindrical inner wall in the area of the elastomer body.

In another embodiment, an insert part having an L-shaped cross-section is arranged at a support ring, the insert part encompassing the support ring on the outer edge. With a transition element that has a wedge-shaped cross-section and that is arranged adjacent to the spacer, provision can be made for the elastomer body to make a gentle transition to the inner wall of the housing here as well. This transition element can be made of plastic in a simple manner.

The support ring with the spacer arranged on it can be secured and held by a split washer that is adjacent to the spacer and that, during assembly, is inserted into a groove provided in the inner wall of the housing.

Depending on the application case and the desired spring rate, the spacer can be provided on one or else on both axial ends of the elastomer body.

Advantageous further developments of the invention ensue from the subclaims.

Other advantages of this invention will become apparent to those skilled in the art from the following detailed description of the preferred embodiments, when read in light of the accompanying drawings.

DETAILED DESCRIPTION OF THE INVENTION

Figure 1:
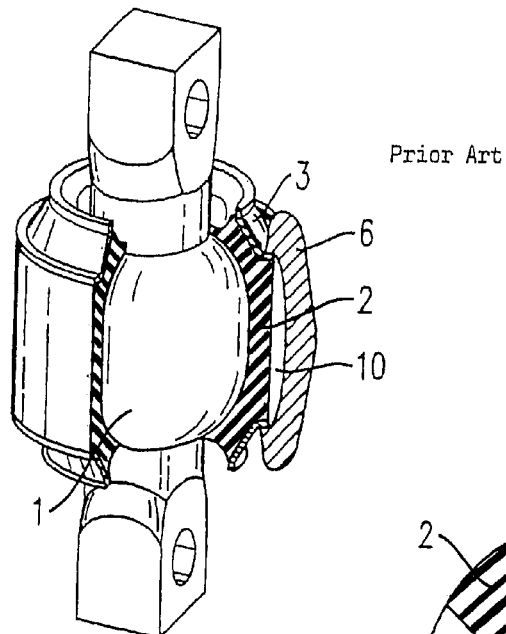
FIG. 1 shows a sectional perspective view of an elastomer joint according to the prior art.

FIG. 1 shows an elastomer joint according to the prior art of the type used so far in particular for chassis parts of motor vehicles, especially to connect chassis parts to suspension points of the vehicle body. It consists essentially of a housing 6, which is only schematically indicated here. The housing 6 has an inner opening whose diameter at the axial ends is smaller than in the middle between the axial ends; therefore, the inner wall of the housing 6 is barrel-shaped. Inside the housing 6, a generally sleeve-shaped elastomer body 2 is arranged in which, in turn, a joint body 1 is arranged. In FIG. 1, the elastomer body 2 is shown in its tension-free state, when its outer wall runs in almost a straight line. The result is a theoretical free space 10 between the outer wall of the elastomer body 2 and the barrel-shaped inner wall of the housing 6. During assembly, however, the elastomer body 2 is prestressed between two support rings 3 so that, after the installation of the joint, the elastomer body 2 lies smoothly against the inner wall of the housing 6. In this state of the elastomer body 2, the result is a progressive spring rate of the joint.

Figure 3:
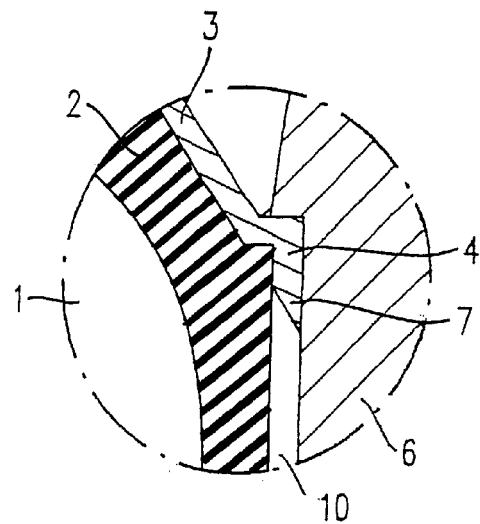
FIG. 3 shows a sectional detail view of an elastomer joint according to the invention as shown in FIG. 2.
Figure 2:
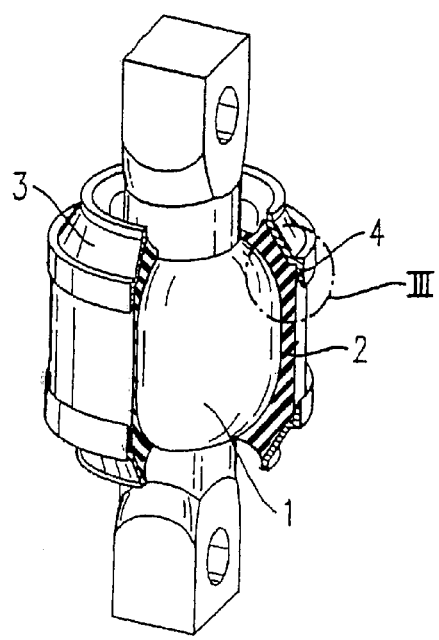
FIG. 2 shows a sectional perspective view of an elastomer joint according to the invention in a first embodiment in which the spacer is designed together with a support ring in one piece.

FIGS. 2 and 3 show an elastomer joint according to a first embodiment of the invention. Unlike the elastomer joint according to the prior art, a spacer 4 is configured at the support ring 3. In this embodiment, the spacer 4 is designed as an encircling collar in one piece with the support ring 3. In this manner, the inner wall of the housing 6 can be designed cylindrically, that is to say, with a constant diameter, while at the same time, the free space 10 is formed between the inner wall of the housing 6 and the elastomer body 2. Here, too, the elastomer body 2 can be prestressed during the installation in such a way that the free space 10 is completely filled by material that has deflected into this free space. This results in a progressive spring rate of the joint and thus in a damping of small amplitudes, as a result of which, for example, at the axle struts, an improved transmission behavior with reduced noise and vibration is achieved, concurrently with precise axle guidance and a hard spring rate under high loads.

At the free end of the spacer 4 facing the middle of the housing 6, a chamfer 7 is provided so that the prestressed elastomer body 2 can make a gentle transition to the cylindrical inner wall of the housing 6. Consequently, the spacer 4 creates the possibility of a radial expansion of the elastomer body 2 in a middle area, thus reducing the prestressing of the elastomer body 2 in this area.

Figure 4:
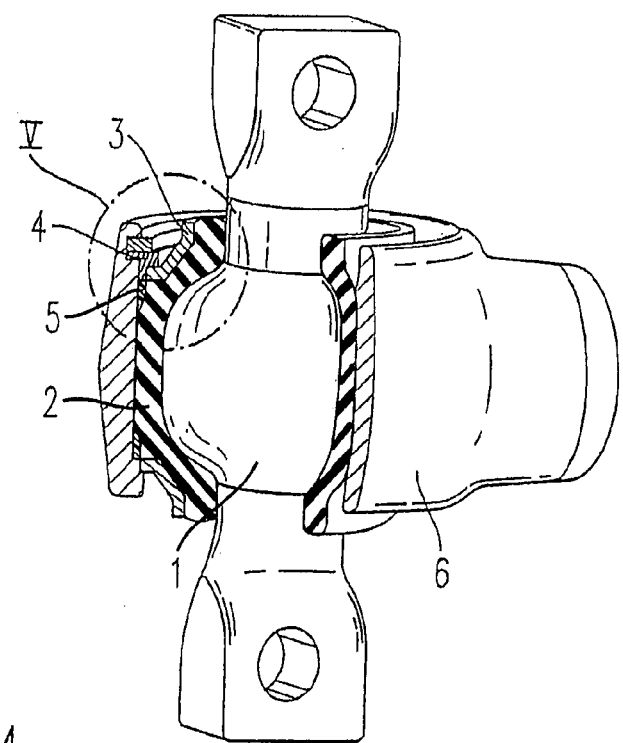
FIG. 4 shows a sectional perspective view of an elastomer joint according to the invention in a second embodiment in which the spacer is designed as an insert part having an L-shaped cross-section.
Figure 5:
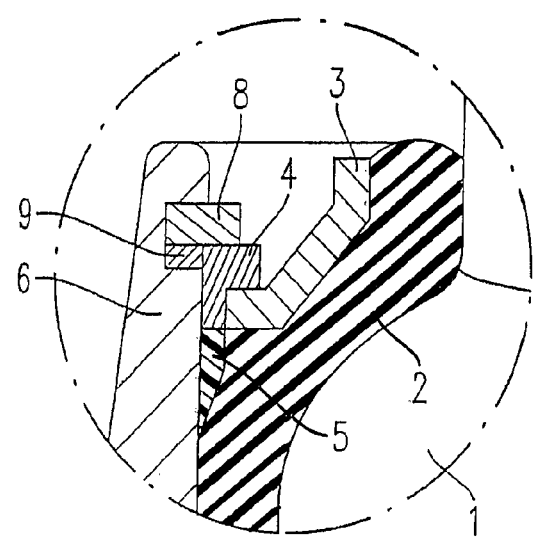
FIG. 5 shows a sectional detail view of an elastomer joint according to the invention as shown in FIG. 4.

FIGS. 4 and 5 show an elastomer joint according to the invention in a second embodiment. In this embodiment, the spacer 4 is an insert part having an L-shaped cross-section that encompasses the support ring 3. Adjacent to the spacer 4, there is a transition element 5 having a wedge-shaped cross-section. This transition element 5 achieves a gentle transition of the elastomer body 2 to the cylindrical inner wall of the housing 6. Here, too, the result is a partial reduction of the prestressing and thus a progressive spring rate of the joint, without a need for material recesses in a middle zone on the inner surface of the housing 6, which is cylindrical inside.

The transition element 5 can be made of plastic, whereas the spacer 4 is made of metal for strength reasons.

The housing 6 has a surrounding groove 9 in which a split washer 8 engages which secures and holds the support ring 3 along with the spacer 4. The split washer 8 lies against the spacer 4 and holds the elastomer body 2 in a prestressed condition in the housing 6.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An elastomer joint adapted for use in motor vehicles, comprising a housing having a cylindrical inner wall, an elastomer body arranged in the housing, a joint body that is arranged in the elastomer body, and a spacer is arranged at an axial end of the elastomer body between the elastomer body and the inner wall of the housing, wherein the spacer provides for a free space existing between the inner wall of the housing and the elastomer body when the elastomer body is in a tension free state prior to assembly, and the free space being filled by the elastomer body when the elastomer body is assembled in the housing, wherein a support ring is arranged at the elastomer body, and the spacer is arranged at the support ring, and wherein the spacer is an insert part having an L-shaped cross-section that encompasses the support ring.

2. The elastomer joint according to claim 1, wherein the spacer and the support ring are one piece.

3. The elastomer joint according to claim 1, wherein the spacer is designed as an encircling collar on the support ring.

4. The elastomer joint according to claim 3, wherein the collar is provided with a chamfer so that a gentle transition is achieved to the inner wall of the housing.

5. The elastomer joint according to claim 1, wherein adjacent to the spacer, a transition element is arranged that has a wedge-shaped cross-section.

6. The elastomer joint according to claim 5, wherein the transition element is made of plastic.

7. The elastomer joint according to claim 1, wherein the spacer is adjacent to a split washer that engages in a groove of the housing.

* * * * *